United States Patent
Kong et al.

(10) Patent No.: US 10,655,892 B2
(45) Date of Patent: May 19, 2020

(54) HEAT TRANSFER PIPE EMBEDDED IN A PREFABRICATED PIPE PILE AND EMBEDDING METHOD

(71) Applicant: HOHAI UNIVERSITY, Nanjing, Jiangsu (CN)

(72) Inventors: Gangqiang Kong, Jiangsu (CN); Yang Zhou, Jiangsu (CN); Xu Huang, Jiangsu (CN); Huaifeng Peng, Jiangsu (CN); Chunhong Li, Jiangsu (CN)

(73) Assignee: HOHAI UNIVERSITY, Nanjing, Jiangsu (CN)

( * ) Notice: Subject to any disclaimer, the term of this patent is extended or adjusted under 35 U.S.C. 154(b) by 111 days.

(21) Appl. No.: 15/579,747

(22) PCT Filed: Jul. 13, 2016

(86) PCT No.: PCT/CN2016/089921
§ 371 (c)(1),
(2) Date: Dec. 5, 2017

(87) PCT Pub. No.: WO2017/024916
PCT Pub. Date: Feb. 16, 2017

(65) Prior Publication Data
US 2018/0180326 A1     Jun. 28, 2018

(30) Foreign Application Priority Data
Aug. 12, 2015   (CN) .......................... 2015 1 0494270

(51) Int. Cl.
*F24T 10/00* (2018.01)
*F24T 10/15* (2018.01)
(Continued)

(52) U.S. Cl.
CPC ............... *F24T 10/00* (2018.05); *E02D 5/30* (2013.01); *E02D 5/50* (2013.01); *E02D 7/18* (2013.01);
(Continued)

(58) Field of Classification Search
CPC . F24T 10/10; F24T 10/13; F24T 10/15; F24T 10/17; E02D 5/24; E02D 5/50; E02D 5/54; E02D 5/28; E02D 5/30; E02D 7/18
See application file for complete search history.

(56) References Cited

U.S. PATENT DOCUMENTS 2,952,130 A  *  9/1960  Mueller .................... E02D 5/50
                                                      405/240
3,540,225 A  *  11/1970  Muller ..................... E02D 5/38
                                                      405/242
(Continued)

FOREIGN PATENT DOCUMENTS

CN         102733375 A      10/2012
CN         102808405 A      12/2012
(Continued)

*Primary Examiner* — Tho V Duong
(74) *Attorney, Agent, or Firm* — Rankin, Hill & Clark LLP

(57) ABSTRACT

A heat transfer pipe embedded in a prefabricated pipe pile including a plurality of prefabricated pipe piles, a heat transfer pipe component and a pump assembly; the prefabricated pipe pile sealed by closing the bottom thereof and sides of which are provided with inclined holes; a locking pin provided at an inner wall of the pipe pile; a steel plate provided on the locking pin, and a steel bar structure bound on the steel plate; the heat transfer pipe component comprises a horizontal heat transfer pipe communicated with a vertical heat transfer pipe with both pipes communicated with the pump assembly, the horizontal pipe embedded and
(Continued)

fixed via the steel bar structure, the vertical heat transfer pipe passes through the inclined holes and fixed in the pipe pile via a steel bar bracket.

7 Claims, 6 Drawing Sheets

(51) Int. Cl.
  *E02D 5/30* (2006.01)
  *E02D 5/50* (2006.01)
  *E02D 7/18* (2006.01)

(52) U.S. Cl.
  CPC ........... *F24T 10/15* (2018.05); *F24T 2010/53* (2018.05); *Y02E 10/125* (2013.01)

(56) References Cited

U.S. PATENT DOCUMENTS

| | | | | |
|---|---|---|---|---|
| 5,038,580 A | * | 8/1991 | Hart | F25B 13/00 |
| | | | | 62/324.6 |
| 5,533,355 A | * | 7/1996 | Rawlings | E21B 17/18 |
| | | | | 62/260 |
| 2013/0055714 A1 | * | 3/2013 | Lakic | H02K 7/1823 |
| | | | | 60/641.2 |

FOREIGN PATENT DOCUMENTS

| | | | | |
|---|---|---|---|---|
| CN | 202672172 U | | 1/2013 | |
| CN | 105040679 A | | 11/2015 | |
| JP | 2009084979 A | | 4/2009 | |
| JP | 2012073026 A | | 4/2012 | |
| JP | 2012077579 A | | 4/2012 | |
| JP | 2013124441 A | | 6/2013 | |
| JP | 5486070 B2 | * | 5/2014 | ............ F24T 10/15 |
| JP | 2014129705 A | | 7/2014 | |
| NL | 1029003 C1 | | 11/2006 | |

* cited by examiner

HEAT TRANSFER PIPE EMBEDDED IN A PREFABRICATED PIPE PILE AND EMBEDDING METHOD

TECHNICAL FIELD

The present invention relates to the technical fields of building pile foundations and ground-source heat pumps, and more particularly, to a heat transfer pipe embedded in a prefabricated pipe pile and an embedding method thereof.

BACKGROUND

Ground-source heat pump technology is an effective energy-saving technique form of using shallow geothermal resources. As an important part of the ground-source heat pump, whether a heat transfer pipe is successfully embedded will have a significant impact on the heat transfer efficiency. Using a pile foundation as a carrier for underground pipe embedding to achieve the energy pile that combines the two functions of upper load and heat transfer, has been widely concerned by researchers in recent years. According to different pile foundation construction technologies, a pile embedded ground-source heat pump technology can be mainly divided into two kinds including embedding in a cast-in-place pile and embedding in a prefabricated pipe pile.

The invention patent "PCC (Large Diameter Pipe Pile by using Cast-in-place Concrete) Energy Pile and Manufacturing Method Thereof" (Patent No.: ZL201210298385.5) discloses an embedded form of filling up a heat transfer liquid in a cavity in the PPC pile, and then inserting an opening type or enclosed type heat transfer pipe. The technical method can improve the heat exchange efficiency, but the workload of excavating PCC pile core soil is relatively large.

The invention patent "Prefabricated Hexagonal Energy Pile and Manufacturing Method Thereof" (Application No.: 201310442139.7) discloses a manufacture method of a heat transfer pipe embedded in a pile body during a prefabricating process of a prefabricated pile. The technical solution improves the site construction efficiency, but also increases the prefabricating difficulty.

The invention patent "Heat Exchanging Hollow Pile and Construction Method Thereof" (Application No.: 201510057071.X) discloses a construction method of embedding a ground-source heat pump heat transfer pipe in an opening hollow pile core soil. The technical solution effectively solves the control problem of embedded depth of the heat transfer pipe and the problem that the backfilling compactness of the pile core soil cannot be easily controlled during the backfilling process of the pile core soil so as to affect the heat transfer efficiency. However, the heat transfer pipe may be broken by tension during the embedding process, or the intensity of the heat transfer pipe needs to be increased to ensure that the heat transfer pipe may not be broken by tension, thus increasing the manufacturing cost. Moreover, the method cannot solve the connection processing problem between the vertical heat transfer pipe at the top portion of the pipe pile and the horizontal heat transfer pipe at the upper portion.

To embed the heat transfer pipe in the prefabricated pipe pile usually has the two technical difficulties as follows: (1) there are slurry, soil mass and even sundries in the prefabricated pipe pile, which causes that the heat transfer pipe cannot be effectively disposed to the designed depth and achieve the designed pile embedded form; (2) when the prefabricated pipe pile is connected to a bearing platform or raft in the top portion, the heat transfer pipe is easily damaged; i.e., a connection difficulty between the vertical heat transfer pipe at the top portion of the prefabricated pipe pile and the horizontal heat transfer pipe may be caused while injecting concrete to a certain depth of the pile core and then inserting a steel bar into the pile core to anchor and connect with the upper structure.

All the conventional construction technologies of embedding heat transfer pipes in the prefabricated pipe pile at present face with the two technical difficulties above. Meanwhile, the backfilling compactness of the pile core soil cannot be easily controlled during the backfilling process of the pile core soil, thus affecting the heat transfer efficiency. Therefore, it is particularly necessary to develop a technology of embedding a ground-source heat pump heat transfer pipe in a prefabricated pipe pile, which is rational in technology, economical and effective.

SUMMARY

Object of the invention: the present invention aims at providing a technology of embedding a ground-source heat pump heat transfer pipe in a prefabricated pipe pile, which is rational in technology, economical and effective, so as to solve the defects in the related art.

Technical solution: a heat transfer pipe embedded in a prefabricated pipe pile according to the present invention comprises a plurality of prefabricated pipe piles arranged side by side, a heat transfer pipe component and a pump assembly; wherein a bottom portion of the prefabricated pipe pile is sealed by closing the bottom thereof; inclined holes are provided at both sides of a top portion of the prefabricated pipe pile; a locking pin is provided at an inner wall of the pipe pile; a steel plate is provided on the locking pin, and a steel bar structure is bound on the steel plate; the heat transfer pipe component comprises a horizontal heat transfer pipe and a vertical heat transfer pipe, one end of the horizontal heat transfer pipe is communicated with the vertical heat transfer pipe, the other end of horizontal heat transfer pipe is connected to the pump assembly, and the other end of the vertical heat transfer pipe is also connected to the pump assembly; meanwhile, the horizontal heat transfer pipe is embedded and fixed via the steel bar structure, an embedded portion of the vertical heat transfer pipe passes through the inclined holes and is fixed in the prefabricated pipe pile via a steel bar bracket; and the connection modes of the heat transfer pipe component in each prefabricated pipe pile comprise a series connection or a parallel connection.

Further, the bottom of the prefabricated pipe pile is prefabricated with reinforced concrete; the prefabricated pipe pile is a pre-stressed concrete pipe pile, the outer diameter of a body of the prefabricated pipe pile is 600-800 mm, the inner diameter of the body of the prefabricated pipe pile is 300-400 mm, and the length of the body of the prefabricated pipe pile is 7-12 m.

Further, the inclined holes are circular holes with an aperture of 25-40 mm, each inclined hole is set in a manner of low interior and high exterior and has an inclined angle of 0-60 degrees, and the distance from the inclined holes to seven points of the inner wall of the pipe pile is 400-800 mm, and two inclined holes are symmetrically configured in a V-shape.

Further, both the horizontal heat transfer pipe and the vertical heat transfer pipe are made of polyethylene; when the heat transfer pipe components horizontally inside the prefabricated pipe piles are connected in series, the horizontal heat transfer pipe and the vertical heat transfer pipe are the same, both of which have an outer diameter of 20-40 mm, and a wall thickness of 5-8 mm; when the heat transfer pipe components inside the prefabricated pipe piles are connected in parallel, the outer diameter of the horizontal heat transfer pipe is 30-50 mm, the outer diameter of the vertical heat transfer pipe is 20-40 mm, both the thickness of the two is 5-8 mm; and the shape of the embedded portion of the vertical heat transfer pipe comprises a single-U shape, a double-U shape, a W shape and a spiral shape.

Further, the locking pin is made of square steel with both a width and thickness of 20-30 mm and a length of 100-150 mm, and the length of the locking pin anchored in the prefabricated pipe pile is 50-100 mm, and the distance from the top of the pile is 200-300 mm.

Further, the steel plate is circular with a diameter of 300-400 mm and a thickness of 5-10 mm, and is tangent to the inner wall of the prefabricated pipe pile.

Further, the steel bar bracket comprises four vertical steel bars and four radial steel bars; the diameter of the vertical steel bar is 10-20 mm, the vertical steel bars are symmetrically distributed in pairwise with equal distance, and the interval between the two vertical steel bars is 200-300 mm; the radial steel bars are also symmetrically distributed in pairwise with equal distance in a "groined" shape with a diameter of 10-20 mm, the radial steel bars are tangent to the inner wall of the pipe pile in length, have a length of 300-400 mm and are arranged along the vertical steel bar at an equal interval of 200-300 mm; and connection points of the vertical steel bar and the radial steel bar are in bound connection or welded connection.

The present invention also discloses an embedding method of the heat transfer pipe embedded in a prefabricated pipe pile, comprising the following steps of:

(1) a prefabricating process of a prefabricated pipe pile: a bottom end of reinforced concrete is prefabricated with a bottom portion of a pipe pile, inclined holes are laterally opened at the sides of a top portion of the pipe pile, and the inclined holes are set in a manner of low interior and high exterior; a locking pin is arranged in an inner wall of the pile at a position 200-300 mm far from a head of the pipe pile; and other pile body prefabricating processes are consistent with that of a conventional prefabricated pipe pile;

(2) form of binding a steel bar bracket, and form of fixing embedded portions of vertical heat transfer pipes: the four vertical steel bars are symmetrically distributed in pairwise with equal distance, then the four radial steel bars are arranged in a "groined" shape and are respectively bound or welded at contact points with the vertical steel bars; then a main embedded portion of the vertical heat transfer pipe is fixed on the steel bar bracket through binding the vertical heat transfer pipe with the vertical steel bars and the radial steel bars, wherein the shape of the main embedded portion of the vertical heat transfer pipe comprises a single-U shape, a double-U shape, a W shape and a spiral shape;

(3) sinking piles: the prefabricated pipe piles are sunk into a soil mass in sequence by means of static pressure or oscillating, and the pile connection between pipe sections is done;

(4) embedding the vertical heat transfer pipe: after completing construction of all the prefabricated pipe pile sections, the soil surrounding the pile at a top portion of the pipe pile is excavated to clean the inclined holes at the top portion of the pipe pile; the steel bar bracket bound with the vertical heat transfer pipe is lowered to a designed depth and the vertical heat transfer pipe is punched out from the oblique holes of the pipe pile, and the outside of the vertical heat transfer pipe at the inlet/outlet contact point between the vertical heat transfer pipe and the pipe pile is protected by binding a sponge so as to prevent wear; and meanwhile, a layer of heat insulating material is wrapped on the part of the vertical heat transfer pipe exposed outside the pipe pile and an upper structure;

(5) repeating the construction steps (3) and (4) to complete the construction of a plurality of prefabricated pipe pile sections and the construction of placing the vertical heat transfer pipe, and conducting water debugging on the vertical heat transfer pipe to test the vertical leak tightness of the vertical heat transfer pipe; then, pouring water or oil inside the prefabricated pipe pile as a heat transfer medium between the heat transfer pipe and the prefabricated pipe pile;

(6) conducting anchoring construction on a joint between the upper structure and the prefabricated pipe pile: placing a steel plate with a diameter equal to that of the inner wall of the pipe pile on a locking pin at the top portion of the prefabricated pipe pile, then binding a steel bar for anchoring and a steel bar for the upper structure, and using the above steel bar structure to bind and embed the horizontal heat transfer pipe; then punching the vertical heat transfer pipe into the upper structure and connecting the vertical heat transfer pipe with the horizontal heat transfer pipe, wherein the super structure comprises a bearing platform, a raft and a plate;

(7) conducting construction on the upper structure: casting concrete in place to pack a pipe pile core above the locking pin and the upper structure; and (8) setting a water collector and a pump externally connected to the horizontal heat transfer pipe, and conducting water debugging on an entire heat transfer pipe system to verify the water integrity of the heat transfer pipe; and completing the construction of embedding the heat transfer pipe in the entire prefabricated pipe pile and the construction of connecting the heat transfer pipe with the horizontal heat transfer pipe.

Further, the heat insulating material in step (4) is a porous or fibrous thermal insulation material, and comprises slag cotton and styrofoam, and the thickness of a wrapping layer of the heat insulating material is 5-10 mm.

Beneficial effects: compared with the prior art, the present invention has the following advantages:

(1) the design of sealing the bottom portion of the prefabricated pipe pile according to the present invention can overcome the problem that the vertical heat transfer pipe cannot be effectively disposed to the designed depth due to the slurry in the preformed pile;

(2) inserting the prefabricated pipe pile core according to the present invention into a steel bar framework can solve the problem of fixing the designed pile embedded form; while the inclined holes at the end portion of the prefabricated pipe pile can solve the engineering difficulty that the connection portion between the vertical heat transfer pipe at the top portion of the prefabricated pipe pile and the horizontal heat transfer pipe is easily damaged during construction; and (3) the present invention also overcomes the problem that the low backfilling compactness of the soil mass for embedding the heat transfer pipe in the conventional prefabricated pipe pile core soil affects the heat transfer efficiency, and the connection of the heat transfer pipes among a plurality of prefabricated pipe piles can improve the utilization efficiency of the pipe pile in terms of heat transfer.

In conclusion, the present invention needs less cost, and has high engineering efficiency and high survival rate of the embedded pipe.

Wherein, 1 refers to horizontal heat transfer pipe, 2 refers to prefabricated pipe pile, 3 refers to steel bar bracket, 4 refers to vertical heat transfer pipe, 5 refers to inclined hole, 6 refers to locking pin, 7 refers to steel plate, 8 refers to water collector, and 9 refers to pump assembly.

DETAILED DESCRIPTION

The technical solutions of the present invention will be described in detail hereinafter, but the protection scope of the present invention is not limited to the embodiments.

Figure 1:
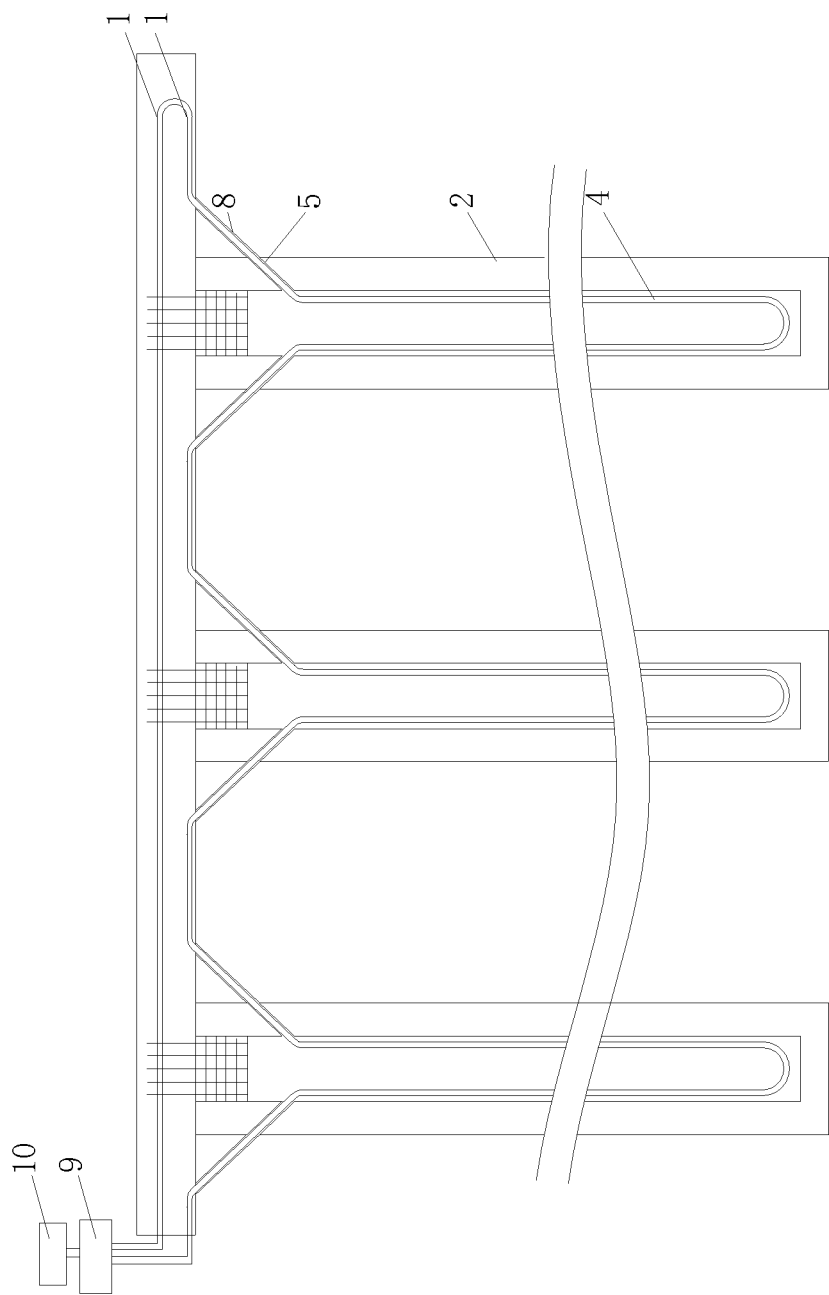
FIG. 1 is a schematic diagram of arranging heat transfer pipe components of prefabricated pipe piles in series.
Figure 2:
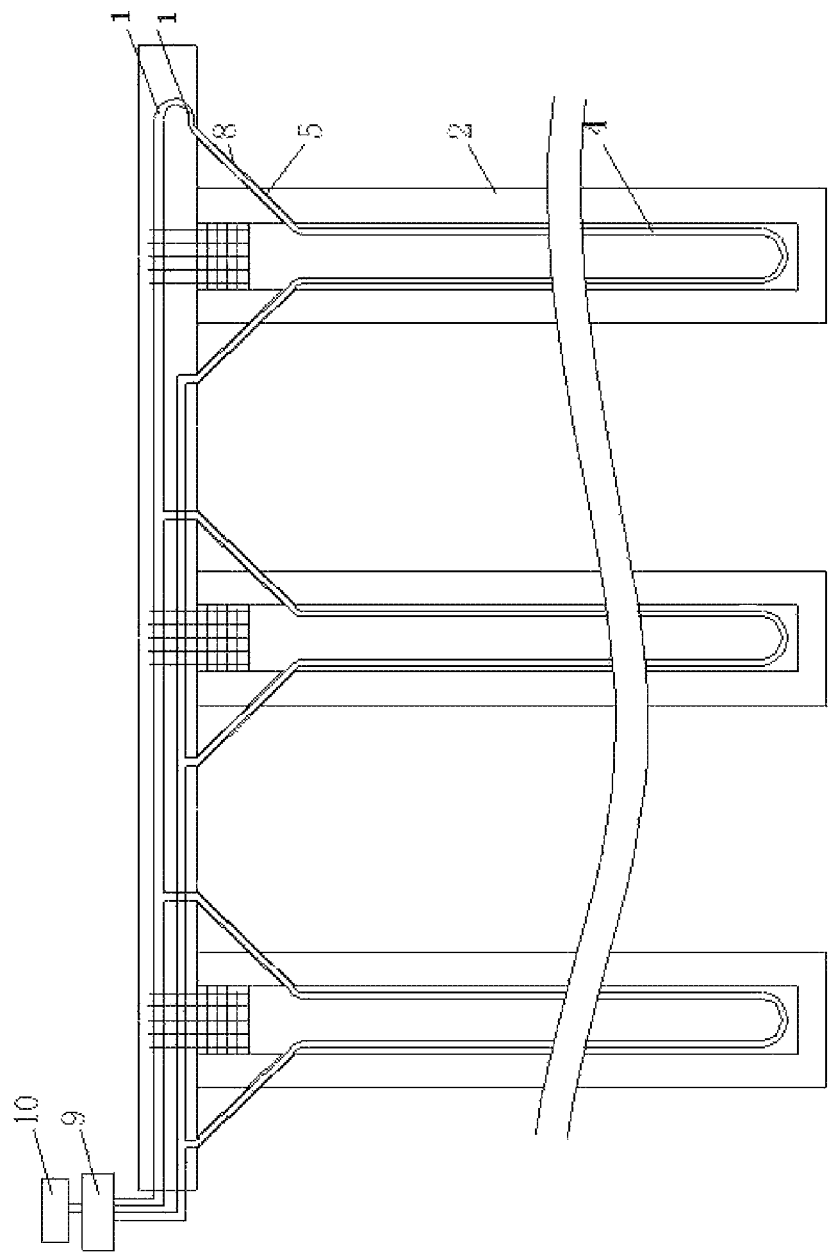
FIG. 2 is a schematic diagram of arranging heat transfer pipe components of prefabricated pipe piles in parallel.
Figure 3:
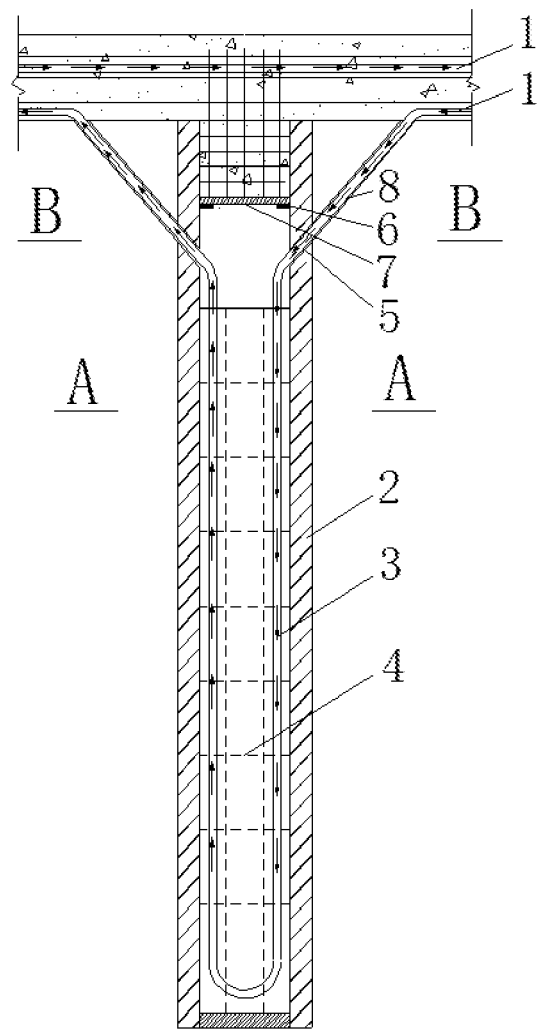
FIG. 3 is a schematic diagram illustrating interiors of a single-U shape vertical heat transfer pipe and a pipe pile embedded with a pipe according to an embodiment.
Figure 4:
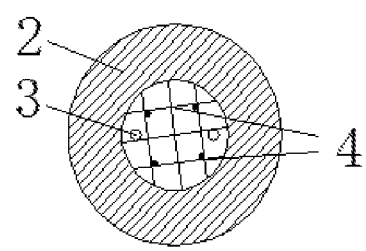
FIG. 4 is a cross-section schematic diagram of AA direction in FIG. 3.
Figure 5:
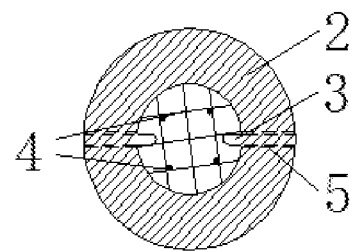
FIG. 5 is a cross-section schematic diagram of BB direction in FIG. 3.
Figure 6:
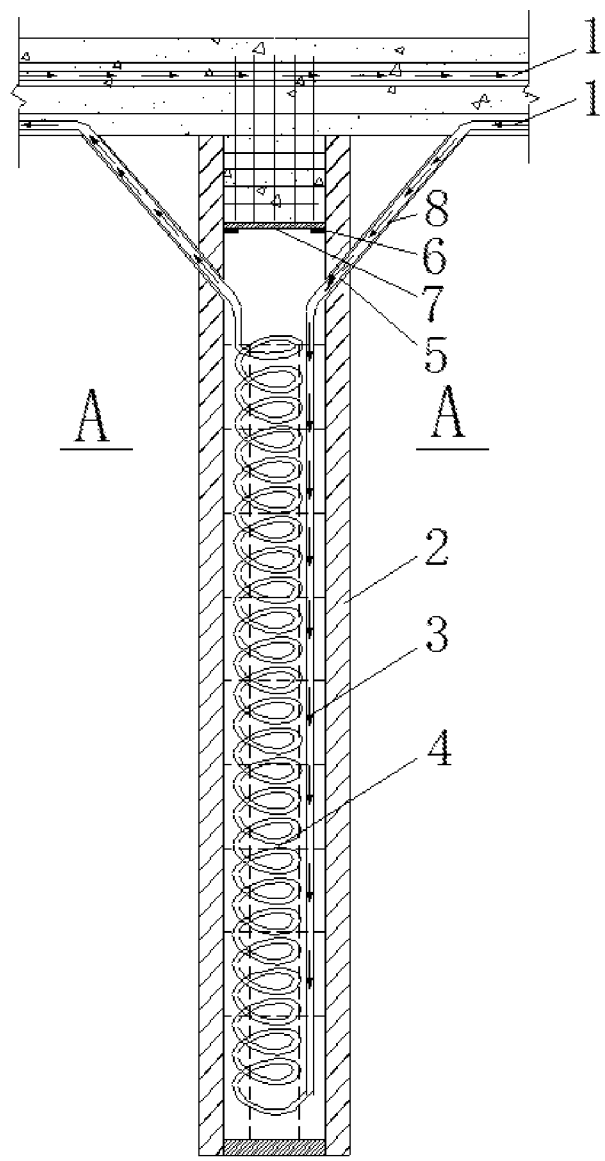
FIG. 6 is a schematic diagram illustrating interiors of a spiral shape vertical heat transfer pipe and a pipe pile embedded with a pipe.
Figure 7:
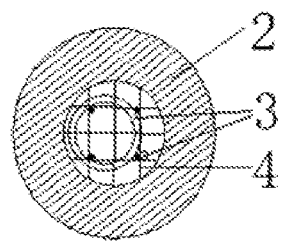
FIG. 7 is a cross-section schematic diagram of AA direction in FIG. 6.
Figure 8:
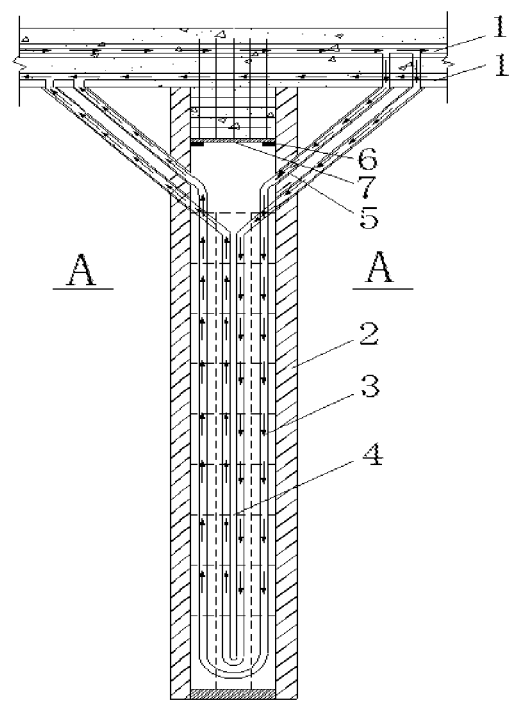
FIG. 8 is a schematic diagram illustrating interiors of a double-U shape vertical heat transfer pipe and a pipe pile embedded with a pipe according to an embodiment.
Figure 8:
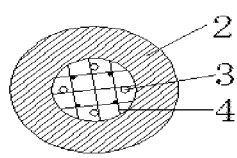
Figure 9:
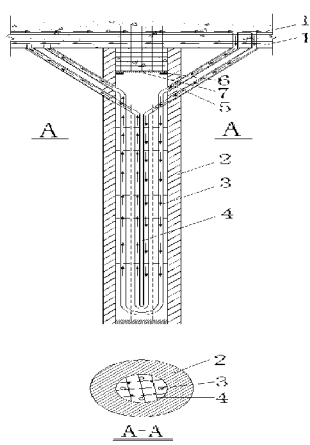
FIG. 9 is a cross-section schematic diagram of AA direction in FIG. 8.

As shown in FIG. 1 and FIG. 2, a heat transfer pipe embedded in a prefabricated pipe pile 2 comprises a plurality of prefabricated pipe piles 2 arranged side by side, a heat transfer pipe component and a pump assembly 9; wherein a bottom portion of the prefabricated pipe pile 2 is sealed by closing the bottom thereof; inclined holes 5 are provided at both sides of a top portion of the prefabricated pipe pile 2; a locking pin 6 is provided at an inner wall of the pipe pile; a steel plate 7 is provided on the locking pin 6, and a steel bar structure is bound on the steel plate 7; the heat transfer pipe component comprises a horizontal heat transfer pipe 1 and a vertical heat transfer pipe 4, one end of the horizontal heat transfer pipe 1 is communicated with the vertical heat transfer pipe 4, the other end of horizontal heat transfer pipe 1 is connected to the pump assembly 9, and the other end of the vertical heat transfer pipe 4 is also connected to the pump assembly 9; meanwhile, the horizontal heat transfer pipe 1 is embedded and fixed via the steel bar structure, an embedded portion of the vertical heat transfer pipe 4 passes through the inclined holes 5 and is fixed in the prefabricated pipe pile 2 via a steel bar bracket 3; and the connection modes of the heat transfer pipe component in each prefabricated pipe pile 2 comprise a series connection or a parallel connection.

The horizontal heat transfer pipe 1 is embedded in an upper structure of the prefabricated pipe pile, the prefabricated pipe pile 2 is circular, a bottom portion of the prefabricated pipe pile is sealed by closing the bottom thereof; the embedded portion of the vertical heat transfer pipe 4 is fixed by the steel bar bracket 3, the vertical heat transfer pipe 4 after passing through the inclined holes 5 is connected to the horizontal heat transfer pipe 1 in the upper structure (bearing platform, plate or raft), and keeps off the top of the pipe pile and is anchored with the upper structure; and the horizontal heat transfer pipes 1 among a plurality of prefabricated pipe pile 2 can be connected in series or in parallel.

The vertical heat transfer pipe 4 is fixed on the steel bar bracket 3, and can be inserted into the pile core together with the steel bar bracket 3 after pile sinking; the steel bar bracket 3 bears the dead loads of the vertical heat transfer pipe 4 and a heat transfer liquid during the use period of the vertical heat transfer pipe 4; the arrangement of the inclined holes 5 facilitates the connection between the vertical heat transfer tube 4 and the horizontal heat transfer pipe 1, and prevents the vertical heat transfer pipe 4 from damage in the construction process of anchoring the top of the pipe pile; and meanwhile, the water collector 8 and the pump assembly 9 are arranged on one side of the entire function, which does not reduce the entire bearing capacity of the pile foundation, and has a high survival rate of the embedded pipe.

Embodiment 1

An embedding method of a heat transfer pipe embedded in a prefabricated pipe pile 2:

Firstly, in the prefabricating process of the prefabricated pipe pile 2 (in the embodiment is: the inner diameter of the prefabricated pipe pile 2 is 800 mm, and the inner diameter thereof is 400 mm), a bottom portion of the prefabricated pipe pile 2 is sealed by closing the bottom thereof; inclined holes 5 are provided at both sides of a top portion of the prefabricated pipe pile 2 (in the embodiment: the aperture is 40 mm, the angle is 30 degrees, and the distance from the top portion of the pipe pile is 500 mm), and the inclined holes 5 are arranged in a manner of low interior and high exterior; a locking pin 6 is provided at an inner wall of the prefabricated pipe pile 2 at a position 300 mm from a head of the pile (in the embodiment: the locking pin 6 has a size of 30*30*150 mm, and the length of the locking pin anchored in a body of the pile is 80 mm); and the conventional pre-stress construction method is adopted in the prefabricating process of other prefabricated pipe piles 2.

Secondly, the form of binding the steel bar bracket 3 and the form (in the embodiment: U shape) of fixing the embedded portion of the vertical heat transfer pipe 4 (in the embodiment: the outer diameter is 30 mm, and the thickness is 8 mm) in the prefabricated pipe pile 2 are as follows: four vertical steel bars (in the embodiment: the diameter is 20 mm, and the interval between every two vertical steel bars is 200 mm) are symmetrically distributed in pairwise with equal distance, and four radial steel bars (in the embodiment: the diameter is 10 mm) are arranged in a "groined" shape and are respectively bound or welded at contact points with the vertical steel bars; the vertical heat transfer pipe 4 is fixed on the steel bar bracket 3 according to a set embedded form (in the embodiment: U shape) by binding the vertical heat transfer pipe 4 with the vertical and radial bracket steel bars.

Then, a pipe junction of the first prefabricated pipe pile 2 is sunk into a soil mass by means of static pressure or oscillating (in the embodiment: static pressure is adopted); after the pipe junction is sunk by a certain depth, a pile head of a section of the prefabricated pipe pile not sunk in the soil mass is higher than the ground by 0.5 m; after the construction of the first prefabricated pipe pile 2 is completed, the second prefabricated pipe pile 2 is moved to the top portion of the first prefabricated pipe pile 2, and the two pile sections are welded after confirming that the axial lines of bodies of the two piles are consistent; the second prefabricated pipe pile 2 is sunk in the soil mass; and the above steps are repeated until the construction of all the prefabricated pipe piles 2 is completed.

Then, the soil surrounding the pile at the top portion of the prefabricated pipe pile 2 is excavated to clean the inclined holes 5 at the top portion of the prefabricated pipe pile 2; the bound steel bar bracket 3 of the vertical heat transfer pipe 4 is lowered to the designed depth, and the vertical heat transfer pipe 4 (in the embodiment: the outer diameter is 30 mm, and the thickness is 8 mm) is punched out from the oblique holes 5 of the prefabricated pipe pile 2, and the outside of the vertical heat transfer pipe 4 at the inlet/outlet contact point between the vertical heat transfer pipe 4 and the pipe pile 2 is protected by binding a sponge so as to prevent wear; a layer of heat insulating material is wrapped on the part of the vertical heat transfer pipe 4 exposed outside the prefabricated pipe pile 2 and an upper structure; the above construction steps are repeated to complete the construction of a plurality of prefabricated pipe pile sections and the construction of placing the vertical heat transfer pipe 4 (in the embodiment: the vertical heat transfer pipes 4 of the prefabricated pipe piles 2 are connected in series), and then water or oil (in the embodiment: water is poured) is poured inside the prefabricated pipe pile 2 as a heat transfer medium between the heat transfer pipe and the prefabricated pipe pile 2; water debugging is conducted on the vertical heat transfer pipe 4 to test the vertical leak tightness of the vertical heat transfer pipe 4 embedded.

after the water debugging, anchoring construction on a joint between the upper structure (in the embodiment: the upper structure is a bearing platform) and the prefabricated pipe pile 2 is conducted: a steel plate 7 with a diameter equal to that of the inner wall of the prefabricated pipe pile 2 (in the embodiment: the diameter is 400 mm, and the thickness is 10 mm) on a locking pin 6 at the top portion of the prefabricated pipe pile 2, then a steel bar for anchoring and a steel bar for the upper structure are bound, and the horizontal heat transfer pipe 1 (in the embodiment: the outer diameter is 30 mm, and the thickness is 8 mm) is bound and embedded by using the steel bars; and then vertical heat transfer pipe 4 is punched into the upper structure and connected to the vertical heat transfer pipe 1.

Finally, construction on the upper bearing platform structure is conducted: concrete is cast in place to pack a pile core of the prefabricated pipe pile 2 above the locking pin and the bearing platform structure; a water collector 8 and a pump assembly 9 externally connected to the horizontal heat transfer pipe 1 is set; and water debugging is conducted on an entire heat transfer pipe system to verify the water integrity of the heat transfer pipe system, and the construction of embedding the heat transfer pipe in the entire prefabricated pipe pile 2 and the construction of connecting the heat transfer pipe with the horizontal heat transfer pipe 1 are completed.

Embodiment 2

An embedding method of a heat transfer pipe embedded in a prefabricated pipe pile 2:

Firstly, in the prefabricating process of the prefabricated pipe pile 2 (in the embodiment is: the inner diameter of the prefabricated pipe pile 2 is 700 mm, and the inner diameter thereof is 300 mm), a base portion of the prefabricated pipe pile 2 is sealed by closing the bottom thereof; inclined holes 5 are provided at both sides of a top portion of the prefabricated pipe pile 2 (in the embodiment: the aperture is 40 mm, the angle is 30 degrees, and the distance from the top portion of the pipe pile is 500 mm), and the inclined holes 5 are arranged in a manner of low interior and high exterior; a locking pin 6 is provided at an inner wall of the prefabricated pipe pile 2 at a position 300 mm from a head of the pile (in the embodiment: the locking pin 6 has a size of 30*30*150 mm, and the length of the locking pin anchored in a body of the pile is 100 mm); and the conventional pre-stress construction method is adopted in the prefabricating process of other prefabricated pipe piles 2.

Secondly, the form of binding the steel bar bracket 3 and the form (in the embodiment: spiral shape) of fixing the embedded portion of the vertical heat transfer pipe 4 (in the embodiment: the outer diameter is 30 mm, and the thickness is 8 mm) in the prefabricated pipe pile 2 are as follows: four vertical steel bars (in the embodiment: the diameter is 20 mm, and the interval between every two vertical steel bars is 200 mm) are symmetrically distributed in pairwise with equal distance, and four radial steel bars (in the embodiment: the diameter is 10 mm) are arranged in a "groined" shape and are respectively bound or welded at contact points with the vertical steel bars; the vertical heat transfer pipe 4 is fixed on the steel bar bracket 3 according to a set embedded form (in the embodiment: spiral shape) by binding the vertical heat transfer pipe 4 with the vertical and radial bracket steel bars.

Then, a pipe junction of the first prefabricated pipe pile 2 is sunk into a soil mass by means of static pressure or oscillating (in the embodiment: oscillating is adopted); after the pipe junction is sunk by a certain depth, a pile head of a section of the prefabricated pipe pile not sunk in the soil mass is higher than the ground by 0.5 m; after the construction of the first prefabricated pipe pile 2 is completed, the second prefabricated pipe pile 2 is moved to the top portion of the first prefabricated pipe pile 2, and the two pile sections are welded after confirming that the axial lines of bodies of the two piles are consistent; the second prefabricated pipe pile 2 is sunk in the soil mass; and the above steps are repeated until the construction of all the prefabricated pipe piles 2 is completed.

Then, the soil surrounding the pile at the top portion of the prefabricated pipe pile 2 is excavated to clean the inclined holes 5 at the top portion of the prefabricated pipe pile 2; the bound steel bar bracket 3 of the vertical heat transfer pipe 4 is lowered to the designed depth, and the vertical heat transfer pipe 4 (in the embodiment: the outer diameter is 30 mm, and the thickness is 8 mm) is punched out from the oblique holes 5 of the prefabricated pipe pile 2, and the outside of the vertical heat transfer pipe 4 at the inlet/outlet contact point between the vertical heat transfer pipe 4 and the pipe pile 2 is protected by binding a sponge so as to prevent wear; a layer of heat insulating material is wrapped on the part of the vertical heat transfer pipe 4 exposed outside the prefabricated pipe pile 2 and an upper structure; the above construction steps are repeated to complete the construction of a plurality of prefabricated pipe pile sections and the construction of placing the vertical heat transfer pipe 4 (in the embodiment: the vertical heat transfer pipes 4 of the prefabricated pipe piles 2 are connected in series), and then or oil (in the embodiment: water is poured) is poured inside the prefabricated pipe pile 2 as a heat transfer medium between the heat transfer pipe and the prefabricated pipe pile 2; water debugging is conducted on the vertical heat transfer pipe 4 to test the vertical leak tightness of the vertical heat transfer pipe 4 embedded.

after the water debugging, anchoring construction on a joint between the upper structure (in the embodiment: the upper structure is a raft plate) and the prefabricated pipe pile 2 is conducted: a steel plate 7 with a diameter equal to that of the inner wall of the prefabricated pipe pile 2 (in the embodiment: the diameter is 400 mm, and the thickness is 10 mm) on a locking pin 6 at the top portion of the prefabricated pipe pile 2, then a steel bar for anchoring and a steel bar for the upper structure are bound, and the horizontal heat transfer pipe 1 (in the embodiment: the outer diameter is 30 mm, and the thickness is 8 mm) is bound and embedded by using the steel bars; and then the vertical heat transfer pipe 4 is punched into the upper structure and connected to the vertical heat transfer pipe 1.

Finally, construction on the upper bearing platform structure is conducted: concrete is cast in place to pack a pile core of the prefabricated pipe pile 2 above the locking pin and the bearing platform structure; and a water collector 8 and a pump assembly 9 externally connected to the horizontal heat transfer pipe 1 is set; and water debugging is conducted on an entire heat transfer pipe system to verify the water integrity of the heat transfer pipe system, and the construction of embedding the vertical heat transfer pipe 4 in the entire prefabricated pipe pile 2 and the construction of connecting the heat transfer pipe with the horizontal heat transfer pipe 1 are completed.

The invention claimed is:

1. A heat transfer pipe embedded in a prefabricated pipe pile, comprising a plurality of prefabricated pipe piles arranged side by side, a heat transfer pipe component and a pump assembly; wherein a bottom portion of the prefabricated pipe pile is sealed by closing the bottom thereof; inclined holes are provided at both sides of a top portion of the prefabricated pipe pile; a locking pin is provided at an inner wall of the pipe pile; a steel plate is provided on the locking pin, and a steel bar structure is bound on the steel plate; the heat transfer pipe component includes a horizontal heat transfer pipe and a vertical heat transfer pipe, one end of the horizontal heat transfer pipe is communicated with the vertical heat transfer pipe, the other end of horizontal heat transfer pipe is connected to the pump assembly, and the other end of the vertical heat transfer pipe is also connected to the pump assembly; the horizontal heat transfer pipe is embedded and fixed via the steel bar structure, an embedded portion of the vertical heat transfer pipe passes through the inclined holes and is fixed in the prefabricated pipe pile via a steel bar bracket; and wherein a connection mode of the heat transfer pipe component in each prefabricated pipe pile is a series connection or a parallel connection.

2. The heat transfer pipe embedded in a prefabricated pipe pile according to claim 1, wherein the bottom of the prefabricated pipe pile is prefabricated with reinforced concrete; the prefabricated pipe pile is a pre-stressed concrete pipe pile, the outer diameter of a body of the prefabricated pipe pile is 600-800 mm, the inner diameter of the body of the prefabricated pipe pile is 300-400 mm, and the length of the body of the prefabricated pipe pile is 7-12 m.

3. The heat transfer pipe embedded in a prefabricated pipe pile according to claim 1, wherein the inclined holes are circular holes with an aperture of 25-40 mm, each inclined hole is set in a manner of low interior and high exterior and has an inclined angle of 0-60 degrees, and the distance from the inclined holes to seven points of an inner wall of the pipe pile is 400-800 mm, and two inclined holes are symmetrically configured in a V-shape.

4. The heat transfer pipe embedded in a prefabricated pipe pile according to claim 1, wherein both the horizontal heat transfer pipe and the vertical heat transfer pipe are made of polyethylene; when the heat transfer pipe components horizontally inside the prefabricated pipe piles are connected in series, the horizontal heat transfer pipe and the vertical heat transfer pipe are the same, both of which have an outer diameter of 20-40 mm, and a wall thickness of 5-8 mm; when the heat transfer pipe components horizontally inside the prefabricated pipe piles are connected in parallel, the outer diameter of the horizontal heat transfer pipe is 30-50 mm, the outer diameter of the vertical heat transfer pipe is 20-40 mm, and both the thickness of the two is 5-8 mm; and the shape of the embedded portion of the vertical heat transfer pipe comprises a single-U shape, a double-U shape, a W shape and a spiral shape.

5. The heat transfer pipe embedded in a prefabricated pipe pile according to claim 1, wherein the locking pin is made of square steel with both a width and thickness of 20-30 mm and a length of 100-150 mm, the length of the locking pin anchored in the prefabricated pipe pile is 50-100 mm, and the distance from the top of the pile is 200-300 mm.

6. The heat transfer pipe embedded in a prefabricated pipe pile according to claim 1, wherein the steel plate is circular with a diameter of 300-400 mm and a thickness of 5-10 mm, and is tangent to the inner wall of the prefabricated pipe pile.

7. The heat transfer pipe embedded in a prefabricated pipe pile according to claim 1, wherein the steel bar bracket comprises four vertical steel bars and four radial steel bars; the diameter of the vertical steel bar is 10-20 mm, the vertical steel bars are symmetrically distributed in pairwise with equal distance, and the interval between the two vertical steel bars is 200-300 mm; the radial steel bars are also symmetrically distributed in pairwise with equal distance in a "groined" shape with a diameter of 10-20 mm, the radial steel bars are tangent to the inner wall of the pipe pile in length, have a length of 300-400 mm and are arranged along the vertical steel bar at an equal interval of 200-300 mm; and connection points of the vertical steel bar and the radial steel bar are in bound connection or welded connection.

* * * * *